Figure 2:
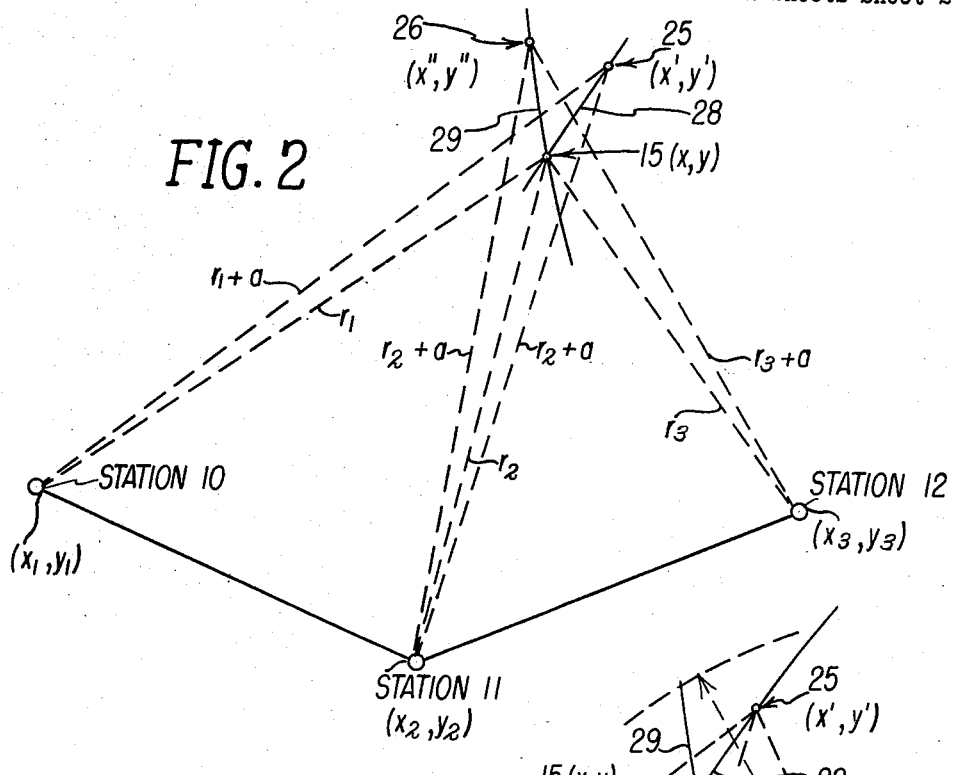

Sept. 22, 1964  E. J. GROTH, JR  3,150,372
COMPUTING SYSTEM
Filed June 23, 1959  2 Sheets-Sheet 1
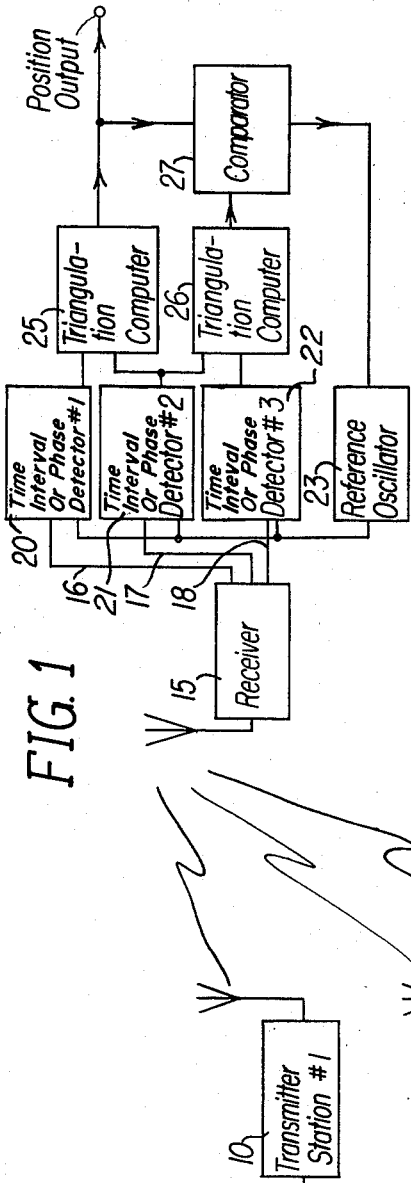
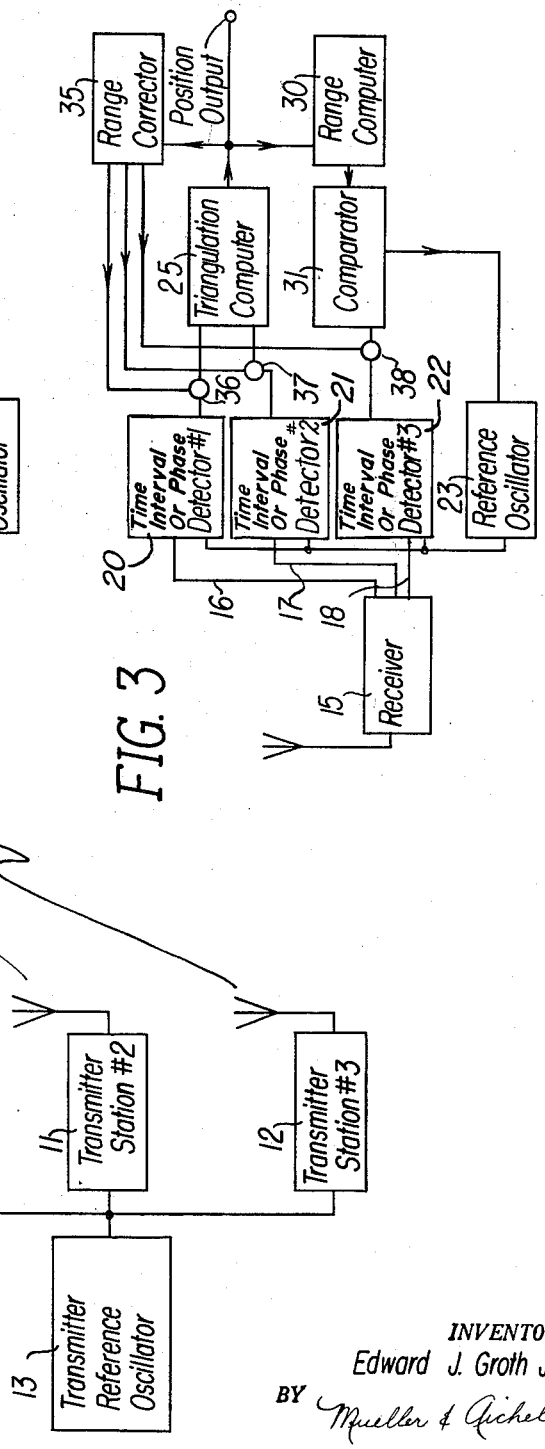
INVENTOR.
Edward J. Groth Jr.
BY Mueller & Aichele
Attys.

INVENTOR.
Edward J. Groth Jr.
BY Mueller & Aichele
Attys.

United States Patent Office 3,150,372
Patented Sept. 22, 1964

3,150,372
COMPUTING SYSTEM
Edward J. Groth, Jr., Scottsdale, Ariz., assignor to Motorola, Inc., Chicago, Ill., a corporation of Illinois
Filed June 23, 1959, Ser. No. 822,341
15 Claims. (Cl. 343—112)

This invention relates generally to electronic navigation systems and more particularly to such a system having a simple and improved computation arrangement for converting information received at a station to easily interpreted coordinates which indicate the position of the station.

Various hyperbolic navigation systems have been used for automatically indicating the position at a station by use of electrical signals. These systems have been of various types but have generally required the use of signal transmissions from three fixed reference stations and have used the differences in the ranges of the station to be located from the three reference stations to determine the position. This is accomplished by using the three transmissions in two pairs to provide two intersecting hyperbolic fields, and then calculating the position from the hyperbolic fields. It has been necessary to use the differences in the ranges from two stations to eliminate errors resulting from drift in the oscillators at the transmitters and receivers in the system. These systems have been quite complex in that a complex computation is involved in solving the equations defining the hyperbolic fields. Further, slight errors in the measurements and calculations may produce a substantial error in position, particularly when the station is located in a particular way with respect to the fixed reference stations.

It is therefore an object of the present invention to provide an improved method and system for computing the position of a receiving station with respect to known transmitting stations.

Another object of the invention is to provide a position indicating system suitable for airborne use which is of simple construction and which is highly accurate.

A further object of the invention is to provide a position indicating system wherein the equipment required to convert electronic signal information into a position indication can be easily mechanized.

A feature of the invention is the provision of a position computing method and system wherein electrical signals received from fixed reference stations are used to provide direct measurements of range and through computations and feedback remove range errors to provide accurate position information.

A further feature of the invention is the provision of a navigation system including a reference oscillator controlling the fixed stations and a second reference oscillator at the receiving station which control range measurements, with such measurements being checked with each other to provide an error signal which controls the frequency of the receiving reference oscillator to hold the two oscillators properly synchronized in frequency and phase, or in time.

Another feature of the invention is the provision of a computation method for a navigation system including three physically spaced fixed station transmitters and receiving apparatus at a station for receiving the three transmissions and with a time reference device cooperating with time interval detectors to provide measurements of the ranges from the three fixed stations, and with the range measurements being utilized to provide two separate computations of positions which are compared to provide an error signal representing the differences in the computed positions, which error signal controls the time reference device to eliminate the difference.

Still another feature of the invention is the provision of a computation arrangement for navigation systems wherein range measurements are derived from signals transmitted from three fixed stations, with the range measurements from two stations being applied to a triangulation computer which determines the position, and with one of these measurements being applied with the range measurement derived from the signal transmitted from the third fixed station to a second triangulation computer to check and correct the position indication. The range to the third fixed station may be computed from the first position determination and compared with the measured range to the third station to correct errors in the measurements.

A still further feature of the invention is the provision of a navigation system which provides measurements of ranges from a receiving station to a plurality of reference stations and in which corrections for range errors can be directly applied to the range measurements to correct the position indication.

Figure 4:
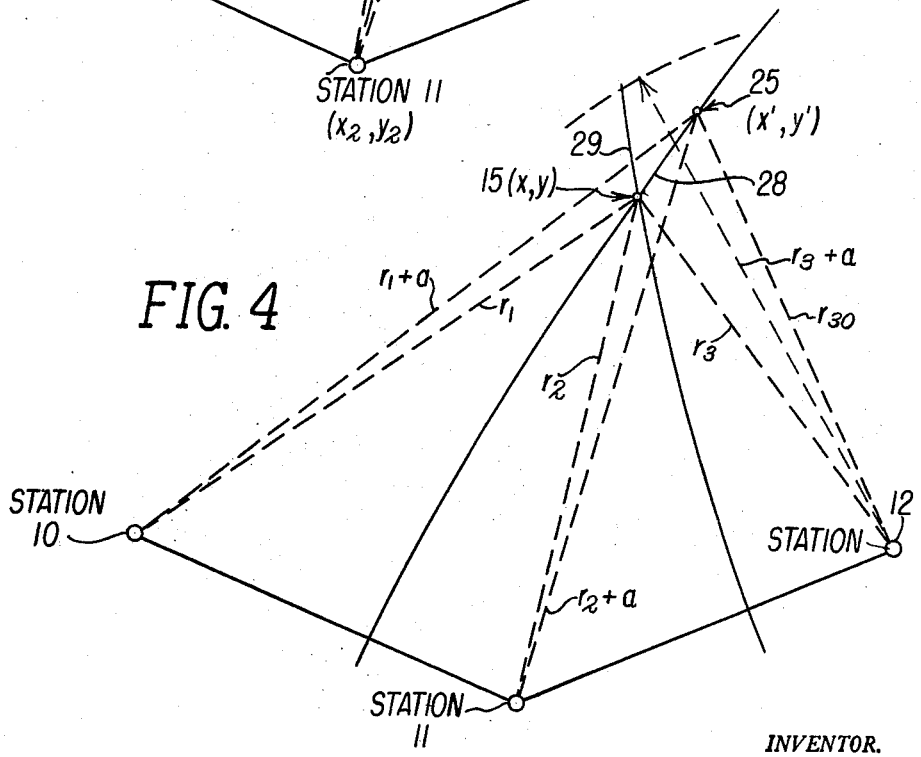

The invention is illustrated by the accompanying drawings in which:
FIG. 1 is a block diagram of the computation system as a part of a navigation system in accordance with the invention;
FIG. 2 illustrates the geometry of the system of FIG. 1;
FIG. 3 is a diagram of a second embodiment incorporating the invention; and
FIG. 4 shows the geometry of the system of FIG. 3.

In accordance with the invention a greatly simplified computing method and system are provided to determine position in navigation systems. Transmitters at three physically spaced reference stations transmit waves controlled by a single time reference device, such as an oscillator. Receiving apparatus at the position to be determined receives the three transmitted waves, and applies the waves from the three transmitters individually to three time interval or phase detectors. A single time reference device, or oscillator, is used to apply reference waves to the time interval detectors so that the outputs thereof are measures of the distances or ranges of the receiver from the three reference stations. The outputs of two detectors are applied to a triangulation computer which determines the position of the receiver from the ranges to two reference stations. The position so determined is compared with the measurement from the third reference station as derived by the third detector to provide an error signal which is used to control the time reference device at the receiving station to eliminate errors and thereby correct the position indication. The error signal may be derived by the use of a second triangulation computer controlled by the range from one of the first two detectors and the range from the third detector to provide a second position indication, and by comparing the two position indications to provide the error signal. Alternatively, the position indication from the triangulation computer may be applied to a range computer to calculate the range to the third station and this may then be compared with the measured range as provided by the third detector to provide the error signal.

Referring now to the drawings, in FIG. 1 there is shown a system in accordance with the invention including three transmitters 10, 11 and 12. These transmitters are all controlled by the reference oscillator 13 so that the waves transmitted thereby are synchronized. The transmitters may radiate sinusoidal carrier waves of the same frequency which are transmitted on a time shared basis. Alternatively, waves of different frequencies may be transmitted or the transmissions may be coded so that signals from the individual transmitters may be isolated at the receiver. By using coded transmissions, ambiguities can be taken care of.

The receiver 15 may be of any type which will receive the waves from transmitters 10, 11 and 12 and provide separate outputs 16, 17 and 18 which reproduce the waves from the three transmitters. The output waves from the receiver are applied respectively to phase detectors 20, 21 and 22, to which reference waves are applied from the reference oscillator 23. It will therefore be apparent that when the reference oscillator 23 is synchronized with the reference oscillator 13 for the transmitters, the phase detectors will measure the phase delay of the three transmissions to thereby produce an output representing the ranges or distances of the receiver from the three transmitters.

The outputs of phase detectors 20 and 21, which may be direct current voltages, are applied to triangulation computer 25 which may be of known construction. The triangulation computer may be provided by any general purpose digital computer such as the IBM 704 Data Processing System manufactured by the International Business Machine Company. This computer utilizes the information applied thereto as to the distances of the receiver from transmitters 10 and 11, together with the positions of the transmitters 10 and 11, to determine the position of the receiver. The computers may be programmed to provide the position as $x$ and $y$ values in a rectangular coordinate system. This position information may be applied to known indicating equipment to indicate the position of the receiver in a particular area.

In the event that the reference oscillator 23 at the rceiver and the reference oscillator 13 at the transmitter are not precisely synchronized, and because of oscillator drift thse will not remain precisely synchronized, the position information will contain an error. To overcome this, position information may be determined a second time by the triangulation computer 26 to which the outputs of phase detectors 21 and 22 are applied. The position information derived from computer 26 is compared with the position information derived from computer 25 in comparator 27 to provide an error signal corresponding to the difference in the two computed positions. The error signal may be a direct current voltage which varies with the distance between the two computed positions. This error signal is applied through a feedback arrangement to the reference oscillator and adjusts the frequency of the reference oscillator in a direction to reduce the error signal. The feedback arrangement will shift the position of the reference oscillator until the error is eliminated and at that time the position indication from the computer 25 is accurate.

Although correction is required to provide correct position indication, the drift rates for the oscillators will be slow so that a long time constant can be built into the feedback error correction system. Accordingly errors resulting from noise, temporary propagation anomalies, etc., are filtered out and do not act to change the reference oscillator.

FIGURE 2 illustrates the geometry of the system illustrated in FIG. 1. The three stations 10, 11 and 12 are shown and each are given coordinates in a rectangular system $(x, y)$ which is chosen for simplicity. Other coordinates such as geographic latitude and longitude could be used. The actual position of the receiver is shown at 15 with the ranges of the receiver from the three stations being indicated by $r_1$, $r_2$ and $r_3$. The measured ranges provided by the phrase detectors 20, 21 and 22 include errors due to relative oscillator drift and are represented by $r_1+a$ for station 10, $r_2+a$ for station 11 and $r_3+a$ for station 12. These ranges with errors will cause the position indicated by the computer 25 to be at the point marked 25 and the position indicated by the computer 26 to be at the point marked 26. Since the positions 25 and 26 differ, the comparator 27 will provide an output representing this difference in position. This will cause the frequency of the references oscillator to shift to reduce the errors in the range, that is, reduce the values of the error $a$ in each range so that the outputs of the two computers will move along lines 28 and 29 respectively to the point 15 which is the true location of receiver 15. The lines 28 and 29 are hyperbolic as the computed change in position for change in oscillator frequency will follow a hyperbolic curve. At the point 15 the error signal is zero so that the reference oscillator will remain at the frequency providing this operation.

In FIG. 3 there is shown a second embodiment of the invention in which the error signal for controlling the frequency of the reference oscillator 23 is derived in a different way. The receiver 15 and the phase detectors 20, 21 and 22 may be identical to the corresponding elements shown in FIG. 1. The triangulation computer 25 may also be identical to this component of FIG. 1 to provide the position indication. The output of the computer 25 is applied to range computer 30 which utilizes the information as to the position of the receiver 15 with respect to the known positions of the fixed transmitters to determine the range of the receiver from the third transmitter. This range information is applied to comparator 31 together with the measured range from the third transmitter derived by the phase detector 22. The comparator 31 will provide an error signal which may be a direct current voltage varying with the difference between the computed and measured ranges, and this is applied to the reference oscillator 23 to control the frequency thereof in a manner such that the error is eliminated. When the computed range from computer 30 agrees with the measured range from phase detector 22, this will indicate that the reference oscillator 23 of the receiver is synchronized with the reference oscillator of the transmitter and that the position indication is accurate.

The operation of the system of FIG. 3 is illustrated by the geometry shown in FIG. 4. The same reference numerals are used as in FIG. 2 to show the position 25 indicated by computer 25 from the range values $r_1+a$ and $r_2+a$. As previously stated, positions which will be indicated by the computer 25, as the reference oscillator changes frequency, will follow the hyperbola 28. To locate the position along the hyperbola 28 which is the correct position (15) the range from station 12 to the computed position 25 is derived by the computer 30. It will be noted that this range $r_{30}$ differs from the true range $r_3$, and that it also differs from the measured range $r_3+a$. Accordingly the comparator 31 will provide an error signal in accordance with the difference between the computed range $r_{30}$ and the measured range $r_3+a$. This is applied to the reference oscillator 23 to cause the same to change frequency. The position indication from computer 25 will therefore move along the hyperbola 28 to point 15 at which point the computed and measured ranges to station 12 will be equal. At this point the comparator 31 will produce a zero error voltage so that the oscillator will remain at the frequency providing this condition. It is pointed out that at this point the hyperbola 28 produced by signals from stations 10 and 11 intersects hyperbola 29 produced by signals from stations 11 and 12 to designate the true position of receiver 15.

FIG. 3 also shows how corrections may be applied to the system to correct for errors resulting from the curvature of the earth, the altitude of the moving station, etc. The output of the triangulation computer 25 is applied to range corrector 35 which develops correction signals for the indicated position. The range corrector 35 may also be a general purpose digital computer as previously identified. Charts are available from the National Bureau of Standards which furnish correction factors for variations in altitude and range, and this information may be applied to the range corrector 35 with the position information from the computer 25. Charts suitable for this purpose are provided in NBS Circular 573, issued June 26, 1956 by the National Bureau of Standards. Information as to the elevation of the station may also be applied to the range corrector 35. The corrector applies correction signals to mixers 36, 37 and 38 which compensate the range signals received from phase detectors 20, 21 and 22 so that the position output will be accurate. The correction signals from the corrector 35 may be direct current voltages. It is obvious that the correcting system is also applicable to the system shown in FIG. 1.

Corrections may be easily applied in this system because the corrections which may be required are functions of the direct range from each transmitting station to the receiver. As these ranges are directly determined in the system, the corrections may be directly applied. In systems where the ranges are not directly determined for the basic computation it may be necessary to determine the ranges to apply the corrections and this complicates the equipment.

The computation method and system described is suitable for use in various different navigation systems of the hyperbolic type. Although a system operating on the phase of received waves has been described, it will be apparent that the method can be used in any system wherein a time interval is determined to give a measurement of range. Actually the phase system described operates from measurement of a time interval, since phase change at a constant frequency is a measure of time. The phase detectors of the system described can be replaced by time difference detectors and the phase errors then become time errors. A time difference detector as described in Napolin Patent No. 2,626,313 may be used in such a system. It will be obvious that the time errors can be eliminated in the same manner as the phase errors.

The arrangement can be used with navigation systems which normally determine position through measurements of two crossed hyperbolic fields. The transmitting stations are positioned in the normal manner as when hyperbolic computation is used. In general the base line between stations such as between stations 10 and 11, and between stations 11 and 12, of FIG. 2 may be chosen to be about one half of the largest dimension of the area to be covered. The angle between the base line from station 10 to station 11 and the base line from station 11 to station 12 may be in the range from 120° to 160°. These dimensions are given merely as examples and other values may be preferred in particular applications.

The system will operate when using transmissions of any frequency in a wide range. In general frequencies ranging from 100 kilocycles to 2 megacycles have been used but it is to be pointed out that other frequencies may be suitable in various applications.

The computation method and system described utilizing triangulation computers is much simpler than prior systems and is more accurate and results in great simplification of the overall navigation system. The triangulation computers are easily mechanized so that a completely automatic system may be provided for various uses, and which because of its simplicity can be provided as a compact unit particularly applicable to airborne use.

I claim:

1. A computing system for determining the position of a station from transmissions received from three known stations having transmitters controlled by the same time reference means and which transmissions are individually derived by receiver means at the station whose position is to be located, said system including in combination, first, second and third time interval detectors, means applying the transmissions from the three known stations individually to said detectors, a second time reference means coupled to said detectors and applying the same reference thereto, whereby said detectors provide outputs representing the time interval of the received transmissions with respect to said second time reference means and such outputs form measures of the ranges from the known stations to the receiving station, a triangulation computer coupled to said first and second detectors for determining the position of the receiving station from the range outputs of said first and second detectors, means coupled to said triangulation computer and to said third detector providing an error signal representing the error in the determined position, and means controlling said second time reference means in response to said error signal whereby the reference therefrom changes to reduce said error signal.

2. A computing system for determining the position of a station from transmissions received from three known stations having transmitters controlled by the same time reference means and which transmissions are individually derived by receiver means at the station whose position is to be located, said system including in combination, first, second and third time interval detectors, means applying the transmissions from the three known stations individually to said detectors, second time reference means coupled to said time interval detectors and establishing a single time reference therefor whereby said detectors provide outputs representing the timing of the received signals with respect to said second reference means, a first triangulation computer coupled to said first and second detectors for providing a first position indication from the time interval outputs of said first and second detectors, a second triangulation computer coupled to said second and third detectors for providing a second position indication from the time interval outputs of said second and third detectors, comparator means coupled to said first and second triangulation computers for providing an error signal in response to a difference in the position indications of said first and second computers, and means controlling said second reference means in response to said error signal in a direction to reduce such error signal.

3. A computing system for determining the position of a station from transmissions received from three known stations having transmitters controlled by the same time reference means and which transmissions are individually derived by receiver means at the station whose position is to be located, said system including in combination, first, second and third time interval detectors, means applying the transmissions from the three known stations individually to said detectors, second time reference means coupled to said detectors and establishing a single time reference therefor, whereby said detectors provide outputs representing the timing of the received signals with respect to said second time reference means, and such outputs form measures of the individual ranges from said receiver means to said transmitters, first computer means coupled to said first and second detectors for providing a position indication from the range measurement outputs of said first and second detectors, second computer means coupled to said first computer means for determining the range from said received to said third transmitter, comparator means coupled to said second computer means and to said third detector providing an error signal representing the error in the range computed by said second computer means as compared to the range measurement of said third detector, and means controlling said second time reference means in response to said error signal in a direction to reduce said error signal.

4. A position determining system including in combination, first, second and third electrical wave transmitters physically spaced from one another, first time reference means coupled to said transmitters for controlling the waves transmitted thereby, receiver means having first, second and third outputs for individually reproducing the waves from said first, second and third transmitters respectively, first, second and third time interval detectors coupled to said first, second and third receiver outputs respectively, second time reference means coupled to said detectors and applying the same time reference thereto, whereby said detectors provide outputs representing the time interval of the received waves with respect to said second time reference means and such outputs form measures of the ranges from said transmitters to said receiver means, a triangulation computer coupled to said first and second phase detectors for determining the position of the receiving station from the range measurements of said first and second detectors, means coupled to said triangulation computer and to said third detector providing an error signal representing the error in the determined position, and means controlling the frequency of said second reference oscillator in response to said error signal whereby such frequency changes in a direction to reduce said error signal.

5. A position determining system including in combination, first, second and third electrical wave transmitters physically spaced from one another, a first reference oscillator coupled to said transmitters for controlling the frequency of the waves transmitted thereby, receiver means having first, second and third outputs for individually reproducing the waves from said first, second and third transmitters respectively, first, second and third phase detectors coupled to said first, second and third receiver outputs respectively, a second reference oscillator coupled to said phase detectors and applying a wave thereto, whereby said phase detectors provide outputs representing the phase of the received waves with respect to the wave from said second oscillator, which outputs form measures of the ranges from said transmitters to said receiver means, a triangulation computer coupled to said first and second phase detectors for determining the position of the receiving station from the range measurements of said first and second phase detectors, means coupled to said triangulation computer and to said third phase detector providing an error signal representing the error in the determined position, and means controlling the frequency of said second reference oscillator in response to said error signal whereby such frequency changes in a direction to reduce said error signal.

6. A computing system for determining the position of a station from transmissions received from three known stations having transmitters controlled by the same time reference means and which transmissions are individually derived by receiver means at the station whose position is to be located, said system including in combination, first, second and third time interval detectors, means applying the transmissions from the three known stations individually to said detectors, a second time reference means coupled to said detectors and applying the same reference thereto, whereby said detectors provide outputs representing the time interval of the received transmissions with respect to said second time reference means and such outputs form measures of the ranges from the known stations to the receiving station, a triangulation computer coupled to said first and second detectors for determining the position of the receiving station from the range outputs of said first and second detectors, means coupled to said triangulation computer and to said third detector providing an error signal representing the error in the determined position, means controlling said second time reference means in response to said error signal whereby the reference therefrom changes to reduce said error signal, and means coupled to said detectors for compensating the range outputs.

7. A position determining system including in combination, first, second and third electrical wave transmitters physically spaced from each other, a first reference oscillator coupled to said transmitters for controlling the frequency of the waves transmitted thereby, receiver means having first, second and third outputs for individually reproducing the waves from said first, second and third transmitters respectively, first, second and third phase detectors coupled to said first, second and third receiver outputs respectively, a second reference oscillator coupled to said phase detectors and applying a wave thereto, whereby said phase detectors provide outputs representing the phase of the received waves with respect to the wave from said second oscillator which form measures of the individual ranges of said receiver means from said transmitters, a triangulation computer coupled to said first and second phase detectors for providing a position computation from the range measurements of said first and second phase detectors, means coupled to said triangulation computer and to said third phase detector providing an error signal representing the error in the computed position, means controlling the frequency of said second reference oscillator in response to said error signal whereby the frequency changes in a direction to reduce such error signal, and means coupled to said phase detectors for applying correcting signals thereto.

8. A computing system for determining the position of a station from transmissions received from three known stations having transmitters controlled by the same reference oscillator and which transmissions are individually derived by receiver means at the station whose position is to be located, said system including in combination, first, second and third phase detectors, means applying the transmissions from the three known stations individually to said phase detectors, a second reference oscillator coupled to said phase detectors and applying the same wave thereto, whereby said phase detectors provide outputs representing the phase of the received waves with respect to the wave from said second oscillator, which outputs form measures of the ranges from the known stations to the receiving station, a first triangulation computer coupled to said first and second phase detectors for determining the position of the receiving station from the range outputs of said first and second phase detectors, a second triangulation computer coupled to said second and third phase detectors for determining the position of the receiving station from the range outputs of said second and third phase detectors, comparator means coupled to said first and second computers providing an error signal representing the error in said determined positions, and means controlling the frequency of said second reference oscillator in response to said error signal whereby such frequency changes in a direction to reduce said error signal.

9. A computing system for indicating the position of a station from transmissions received from three known stations having transmitters controlled by the same reference oscillator and which transmissions are individually derived by receiver means at the station whose position is to be located, said system including in combination, first, second and third phase detectors, means applying the transmissions from the three known stations individually to said phase detectors, a second reference oscillator coupled to said phase detectors and applying the same wave thereto, whereby said phase detectors provide outputs representing the phase of the received waves with respect to the wave from said second oscillator, which outputs form measures of the ranges from the known stations to the receiving station, a triangulation computer coupled to said first and second phase detectors for determining the position of the receiving station from said range outputs of said first and second phase detectors, a range computer coupled to said triangulation computer for determining the range of the receiving station from the third known station, comparator means coupled to said range computer and to said third phase detector providing an error signal representing the difference between the computed range and the measured range between the third known station and the receiving station, and means controlling the frequency of said second reference oscillator in response to said error signal whereby such frequency changes in a direction to reduce said error signal.

10. The method of computing the position of a station from transmissions received at the station from three known stations which transmit waves controlled by the same time reference, and which waves are individually derived by receiver means at the station whose position is to be computed, said method including the steps of, developing a time reference at the receiving station, detecting from the waves the time intervals corresponding to the three known stations to provide outputs which form measures of the ranges from the known stations to the receiving station, computing by triangulation from two of the measured range outputs the position of the receiving station, comparing the third measured range output with the computed position to detect error in the computed position, and controlling the time reference at the receiving station to eliminate the error.

11. The method of computing the position of a station from transmissions received at the station from three known stations which transmit waves controlled by the same reference oscillator, and which waves are individually derived by receiver means at the station whose position is to be computed, said method including the steps of, developing reference oscillations at the receiving station, detecting the phase of the waves from the three known stations with respect to the reference oscillations to provide outputs which form measures of the ranges from the known stations to the receiving station, computing by triangulation from two of the measured range outputs the position of the receiving station, computing by triangulation from one of the two measured range outputs and from the third measured range output the position of the receiving station, comparing the computed positions to determine any difference therebetween and controlling the frequency of the reference oscillations to eliminate such difference.

12. The method of computing the position of a station from transmissions received at the station from three known stations which transmit waves controlled by the same reference oscillator, and which waves are individually derived by receiver means at the station whose position is to be computed, said method including the steps of, developing reference oscillations at the receiving station, detecting the phase of the waves from the three known stations with respect to the reference oscillations to provide outputs which form measures of the ranges from the known stations to the receiving station, computing by triangulation from two of the measured range outputs the position of the receiving station, computing the range to the third known station from the computed position of the receiving station, comparing the computed range to the third known station with the measured range thereto to detect any difference therebetween and controlling the frequency of the reference oscillations to eliminate such difference.

13. A computing system for determining the position of a station from transmissions received at such station from three known stations having transmitters controlled by the same time reference means, said system including in combination, first, second and third time interval detectors, means applying the transmissions from the three known stations individually to said detectors, a second time reference means coupled to said detectors and applying the same reference thereto, whereby said detectors provide outputs representing the time interval of the received transmissions with respect to said second time reference means and such outputs form measures of the ranges from the known stations to the receiving station, triangulation computer means, coupling means connecting said first and second detectors to said triangulation computer means for providing a position indication from the range measurements of said first and second detectors, range computer means coupled to said triangulation computer means for determining the range from said third transmitter to said receiver, comparator means coupled to said range computer means, coupling means connecting said third detector to said comparator means whereby an error signal is produced thereby representing the error in the range computed by said range computer means as compared to the range measured by said third detector, means controlling said second time reference means in response to said error signal whereby said second time reference means changes in a direction to reduce said error signal, range corrector means connected to said triangulation computer for providing compensating signals for correcting the range measurements at the position indicated, and means applying said compensating signals to said coupling means for adjusting the outputs of said detectors.

14. A computing system for determining the position of a station from transmissions received at such station from three known stations having transmitters controlled by the same reference oscillator means, said system including in combination, first, second and third phase detectors, means applying the transmissions from the three known stations individually to said detectors, reference oscillator means coupled to said detectors and applying the same reference wave thereto, whereby said detectors provide outputs representing the phase difference of the received transmissions with respect to said wave from said second reference oscillator means and such outputs form measures of the ranges from the known stations to the receiving station, triangulation computer means, coupling means connecting said first and second detectors to said computer means for providing a position indication from the range measurements of said first and second detectors, range computer means coupled to said triangulation computer means for determining the range from said third transmitter to said receiver, comparator means coupled to said range computer means, coupling means connecting said third detector to said comparator means whereby an error signal is produced thereby representing the error in the range computed by said range computer means as compared to the range measured by said third detector, means controlling the frequency of said second reference oscillator in response to said error signal whereby said frequency changes in a direction to reduce said error signal, range corrector means connected to said triangulation computer for providing compensating signals for correcting the range measurements at the position indicated, and means applying said compensating signals to said coupling means for adjusting the outputs of said detectors.

15. A computing system for determining the position of a station from transmissions received from three known stations having transmitters controlled by the same time reference means, and which transmissions are individually derived by receiver means at the station whose position is to be located, said system including in combination, first, second and third time interval detectors, means applying the transmissions from the three known stations individually to said detectors, a second time reference means coupled to said detectors and applying the same reference thereto, whereby said detectors provide outputs representing the time interval of the received transmissions with respect to said second time reference means and such outputs form measures of the ranges from the receiving station to the known stations, a triangulation computer coupled to said first and second detectors for determining the position of the receiving station from the range outputs of said first and second detectors, means coupled to said triangulation computer and to said third detector providing an error signal representing the error in the determined position, means controlling said second time reference means in response to said error signal whereby the reference therefrom changes to reduce said error signal, and compensating means coupled to said triangulation computer and to said detectors for compensating the outputs of said detectors at the position determined by said computer, to thereby correct the range measures and the position determined therefrom.

References Cited in the file of this patent

UNITED STATES PATENTS

| | | | |
|---|---|---|---|
| 1,406,996 | Morrill | Feb. 21, | 1922 |
| 2,406,468 | Loughlin | Aug. 27, | 1946 |
| 2,413,637 | Loughlin | Dec. 31, | 1946 |
| 2,483,557 | O'Brien | Oct. 4, | 1949 |
| 2,581,438 | Palmer | Jan. 8, | 1952 |
| 2,873,445 | Palmer | Feb. 10, | 1959 |